April 8, 1969  G. T. McKINZIE  3,437,759
BURGLAR ALARM DEVICE FOR DETECTING SOUNDS IN
A PROTECTED AREA Filed Oct. 21, 1965  Sheet 1 of 5

INVENTOR
George T. McKinzie
BY Robert E. Clever
ATTORNEY

INVENTOR
George T. McKinzie
BY Robert E. Keene
ATTORNEY

INVENTOR
George T. McKinzie
BY Robert E. Kane
ATTORNEY

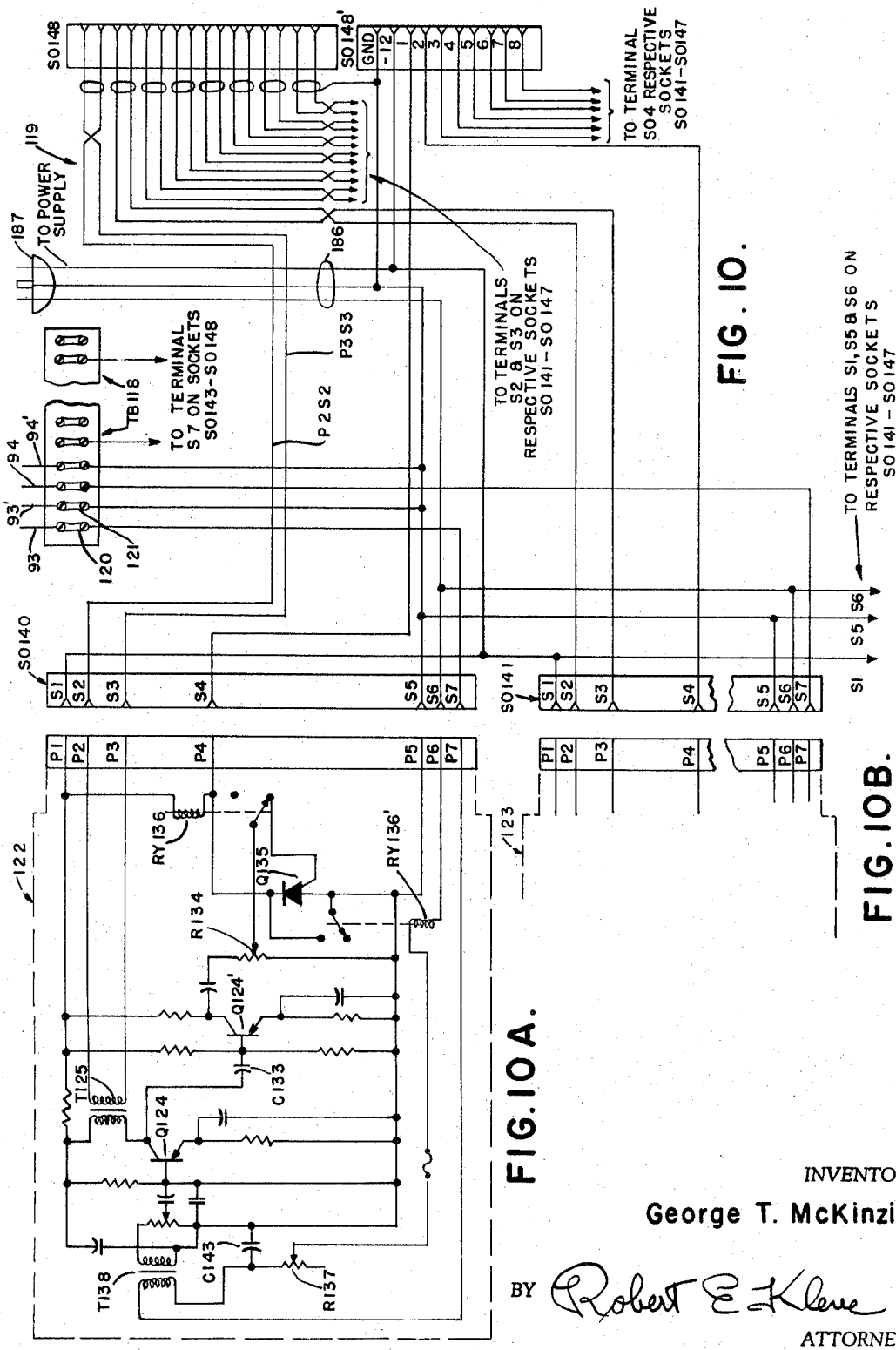

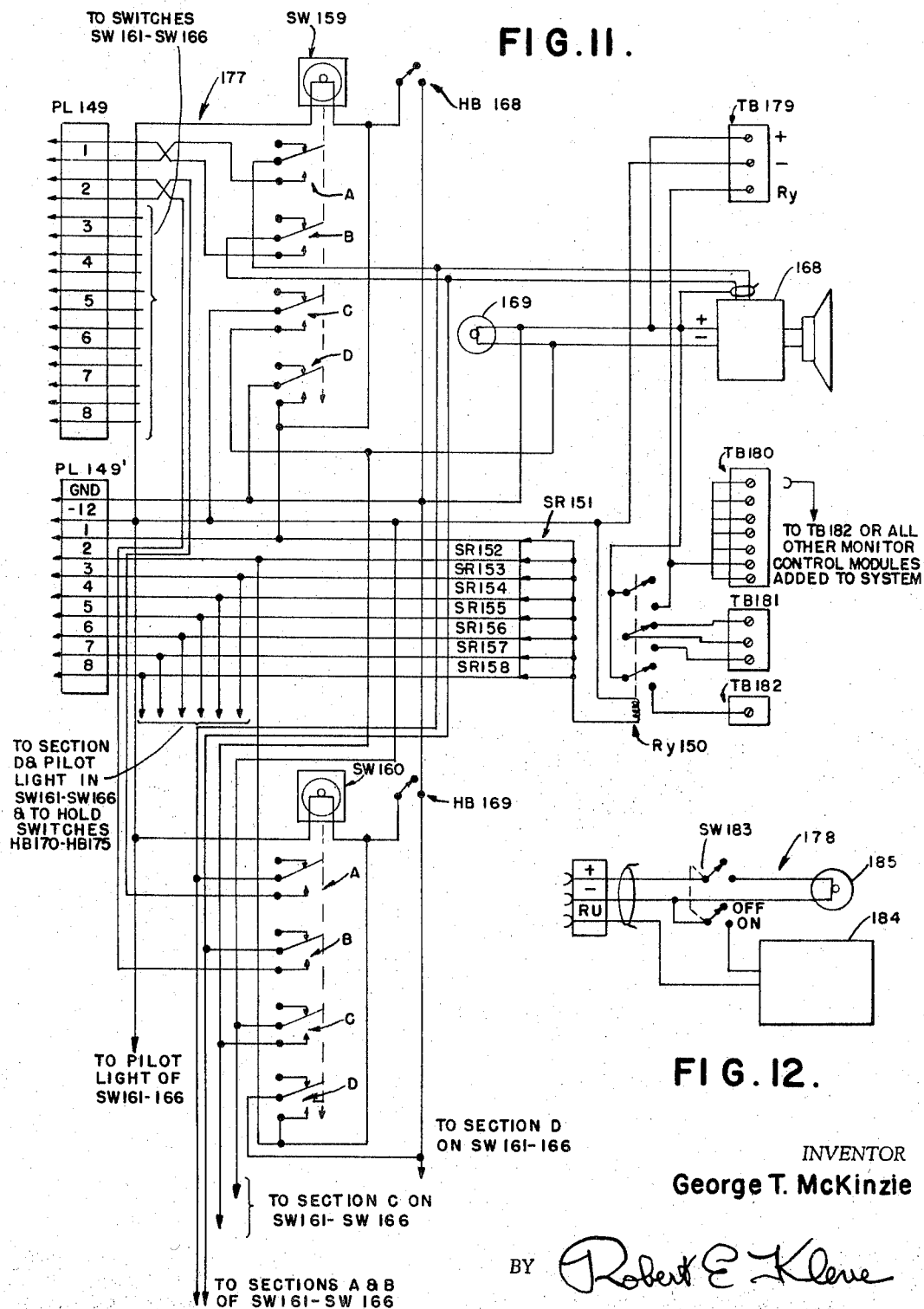

United States Patent Office 3,437,759
Patented Apr. 8, 1969

3,437,759
BURGLAR ALARM DEVICE FOR DETECTING
SOUNDS IN A PROTECTED AREA
George T. McKinzie, 2207 Ave. E,
Bismarck, N. Dak. 58501
Continuation-in-part of application Ser. No. 424,313,
Jan. 8, 1965. This application Oct. 21, 1965, Ser.
No. 506,430
Int. Cl. H04m 11/04
U.S. Cl. 179—5
2 Claims

ABSTRACT OF THE DISCLOSURE

The invention comprises a receiver and pick up unit with telephone lines connecting said receiver unit to said pick up unit, said pick up unit being powered by said receiver unit via said telephone lines, said pick up unit being adapted to pick up sounds within its range and transmit them to said receiver unit, said receiver unit having an amplification system, a reproducing system, and a triggering system, said triggering system including adjustable means preventing amplification and reproduction of said sounds by said receiver unit until said sounds have reached a level set by said adjustable means, said receiver also including a second adjustable means to compensate for different lengths of telephone lines.

---

This invention relates to detection and alarm devices, more particularly the invention relates to devices and apparatus for the detection of trespassers, burglars, and the like.

This application is a continuation-in-part of my earlier filed pending United States application, U.S. Ser. No. 424,313, filed Jan. 8, 1965, now abandoned.

It is an object of the invention to provide a novel sound detection device which will detect the sounds made by a person in one location and transmit and reproduce the sound in a receiver at a remote location so that the operator of the receiver may hear the sound.

It is a further object of the invention to provide a novel detection device which detects the sounds made by a burglar or trespasser in a building and transmits the sound to a remote monitoring receiver for amplification.

It is a further object of the invention to provide a sound device which transmits any sounds in a building and when these sounds exceed a certain threshold level, the device amplifies them and reproduces them at a remote receiver.

Another object is to provide sound compensating means for noises outside of a building so that such noises do not actuate the alarm system.

Further objects and advantages of the invention will become apparent as the description proceeds and when taken in conjunction with the accompanying drawings wherein:

FIUGRE 1 is a side elevational view of the detector, receiver, and power pack unit shown installed in operative relation.

FIGURE 10 is a schematic circuitry diagram of the alarm receiver module rack of the receiver unit of the third modified form.

FIGURE 10A is a schematic circuitry diagram of one alarm receiver module (printed circuitry card) of the receiver unit of the third modified form.

FIGURE 10B is a fragmentary showing of another alarm receiver module (printed card).

FIGURE 11 is a schematic circuitry diagram of the monitor control module of the receiver unit of the third modified form.

FIGURE 12 is a schematic circuitry diagram of the alarm tone module of the receiver unit of the third modified form.

Briefly stated, the invention comprises a receiver and a pick up unit with telephone lines connecting the receiver unit to the pick up unit, the pick up unit being powered by the receiver unit with the pick up unit being adapted to pick up sounds within its range and transmit the sounds to the receiver unit. The pickup unit is provided for sound compensating means so that external noises will not actuate the alarm system. The receiver unit has an amplification system, and a triggering unit which prevents the amplification of the sounds from being transmitted, until they have reached a selected level. The receiver unit also has adjustable means to compensate for varying lengths of telephone lines.

Figure 1:
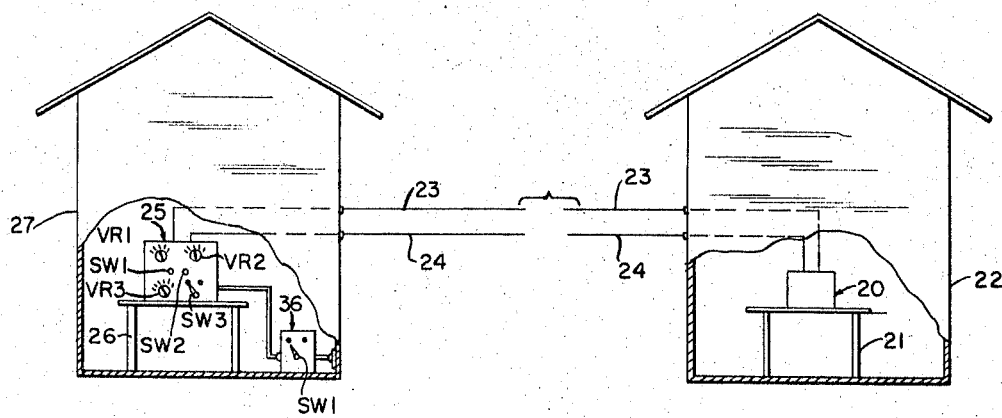

Referring more particularly to the drawings, in FIGURE 1 the pick up unit 20 is shown positioned on a table 21 in a building 22 being protected. Telephone lines 23 and 24 are connected at their one ends to the pick up unit 20. The telephone lines 23 and 24 are connected at their other ends to the receiver unit 25. The receiver unit 25, for purposes of illustration, is shown positioned on a table 26 in a building 27.

First form of detector and receiver

Figure 2:
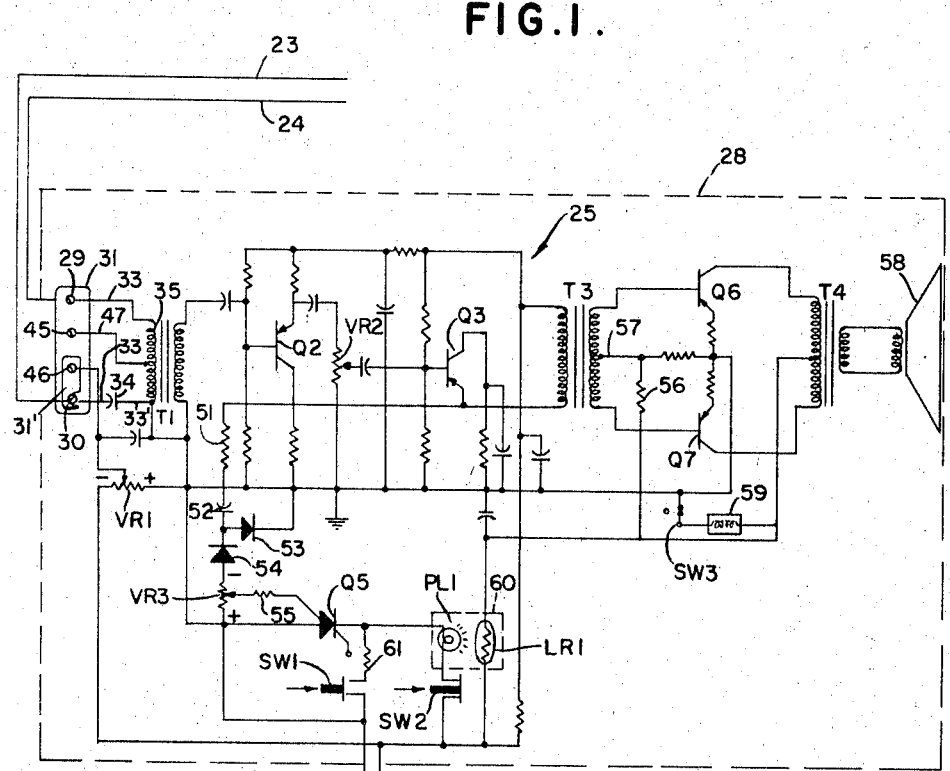
FIGURE 2 is a schematic electrical circuitry diagram of the first form of receiver unit.

The receiver unit 25 may be enclosed in any convenient or suitable type of case or housing 28. The pick up unit 20 also may be enclosed in any suitable type of casing or housing. In FIGURE 2, the details of the electrical structure of the first form of receiver unit 25 are disclosed with the case or housing 28 shown in dashed lines. The telephone lines 23 and 24 extend into the housing 28 of the receiver unit 25 and are attached to terminal posts 29 and 30, respectively. The posts 29 and 30 are mounted to an insulating, non-conductive, plate 31. Wire 32 and wire 33 through capacitor 34 and wire 33′ connect the telephone lines 23 and 24 through posts 30 and 29, respectively, to the opposite ends of the winding 35 of the transformer T1.

The power or voltage to operate the pick up unit 20 is supplied from the power pack 36 through the receiver 25 over the telephone lines 23 and 24 to the pick up unit 20.

The power pack unit 36 carries a conventional 12 volt battery 38 mounted within the housing. The power pack unit has a plug 39 which is connected to a conventional source of power line current (117 v. AC). A main double pole, single throw switch SW1A, SW1B, in the power pack unit, activates both the detector and receiver unit, when shown in one of its closed position illustrated in FIGURE 2. The battery 38 is provided for the unit, to operate the detector and receiver unit in the event there is a power line failure. So long as there is a source of power through the plug 39, and the main switch is closed in the position, shown, the relay coil RY1 will be continuously energized, holding the contact 40 to the right against the tension of its spring (as illustrated in FIGURE 2), thereby breaking the connection to the battery terminals 41 and 42.

In the event of a power line failure, however, this deactivated the coil of RY1 to permit the contact 40 to swing to the left by the action of the tension spring, thereby completing the circuit to the battery terminals 41 and 42, thereby enabling the detector and receiver unit to operate off of the 12 volt battery 38, connected to the terminals 41 and 42.

The main SW1A, SW1B is a double pole single throw switch with one switch portion SW1A and another switch portion SW1B which opens and closes simultaneously, by the turning of the switch SW1 by its operating bar 39' between portions SW1A and SW1B. Having both portions SW1A and SW1B open prevents the battery 38 from operating the unit, when the operator wishes the detector and receiver unit to be entirely turned off.

The power from one lead of the power pack 36 to operate the detector unit is fed through the socket and plug connection 43 and 44 to the receiver unit 25 to the terminal by the wire along the left edge of FIGURE 2 to post 46 and along metal strap 31' to the terminal post 30 along telephone lines 23 to the pick up unit 20. The variable resistor VR1 is adjustable to compensate for different lengths of telephone lines, since the detector unit 20 may be spaced several blocks or several miles from the receiver unit 25.

The power from the other lead of the power pack goes to one terminal of switch SW1 through a wire to variable resistor VR3 through diode 54 and diode 53 to a ground wire which extends to the plus terminal of variable resistor VR1 to lead 33' connected to the left coil 35 of transformer T' to post 29 and to telephone line 24 to the detector unit 20. The circuit is completed to the other wire as can be observed by following the upper horizontal wire from the power pack upwardly to the resistor VR3 and then horizontally and up to the wire running horizontally below transformer T1 and then up the lead from the right side of the condenser in such wire to the coil 35 and through the coil 35 to contact 29, thereby completing the circuit to both telephone lines 23 and 24.

Figure 3:
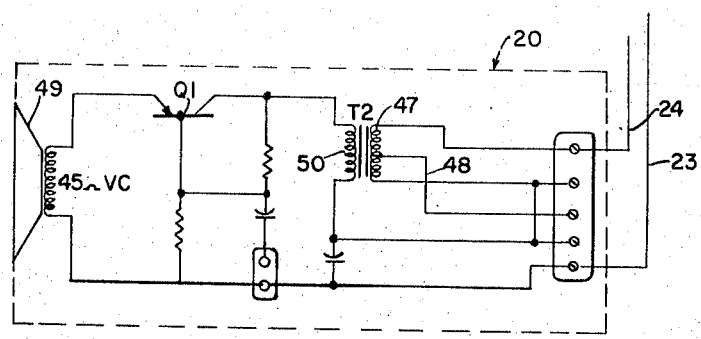
FIGURE 3 is a schematic electrical circuitry diagram of the first form of pick up unit, for use with the receiver unit illustrated in FIGURE 2.

At the detector unit 20, as shown in FIGURE 3, the voltage supplied over the telephone lines 23 and 24, from the receiver unit enters through suitable terminals and leads to the speaker microphone 49.

The preferred form of the detector unit 20 for use with the receiver unit 25, shown in FIGURE 2, is shown in FIGURE 3. However, where only a short distance separates the receiver and detector units, and hence only relatively short telephone lines 23 and 24 are required, the transistor amplifier Q1 may be eliminated and the alternate form of detector unit 20', illustrated in FIGURE 4, may be used in conjunction with the receiver unit 25, shown in FIGURE 1.

The signal or sound received by the speaker 49 is amplified by transistor Q1 to the winding 50 of the transformer T2 where it is picked up by the winding 47 and transmitted over the telephone lines 23 and 24 to the winding 35 of the transformer T1 of the receiver unit 25, where it is amplified by transistor Q2 and passes through variable resistor VR2. Variable resistor VR2 is adjustable to control the minimum and maximum volume of the amplification of the sound or signal from the detector unit and is normally set at maximum value.

The signal from transistor Q2 is transmitted on through VR2 and on through transistor Q3 where a portion of it is taken off and back through resistor 51 and condenser 52. Also a portion of the signal taken off at Q2 down through diode 53, where it is rectified by diodes 53 and 54. It then passes into variable resistor VR3. Variable resistor VR3 is adjustable, to determine the amount of voltage allowed to pass therethrough. When there is sufficient voltage, or in other words, when the noise level at the detector unit has reached a certain level, depending upon the setting of the variable resistor, it will then be sufficient to trigger Q5 into a state of conduction allowing the sufficient negative voltage to pass from the variable resistor VR3 through a resistor 55 and through silicon controlled switch Q5 to light the pilot light PL1. The pilot light PL1 is located closely adjacent a light sensitive resistor LR1. The light sensitive resistor LR1 when exposed to the light from the pilot light PL1 decreases in resistance value to allow current to pass through LR1 up through resistor 56 to the center tap 57 of the transformer primary winding of transformer T3 where it then transmits the signal through transistor amplifiers Q6 and Q7 into the outer ends of the winding of transformer T4 where the speaker 58 then reproduces the signal or sound.

A conventional door buzzer 59 is also activated by the current being allowed to pass through the light sensitive resistor. A switch SW3 has two positions to activate and deactivate the buzzer 59.

The pilot light PL1 and light sensitive resistor LR1 are enclosed and sealed in a box 60, which prevents any light other than the pilot light PL1 from activating the light sensitive resistor.

A test button switch SW1 is also provided. When the normally open test button switch SW1 is closed this completes the circuit through resistor 61 and the pilot light PL1 and the pilot light PL1 is illuminated. This resorts the unit to full loudspeaker volume so long as switch SW1 is held closed.

Once the silicon controlled switch Q5 is triggered on it will continue to conduct or in other words will remain in a conductive state until the normally closed reset button SW2 is pressed. The pressing of the reset button SW2 removes the cathode voltage from Q5 and allows it to return to a state of nonconduction, in which state it will remain until it is triggered on by another sound signal of sufficient level. When the conduction ceases by the pressing of the reset button SW2, this extinguishes the pilot light PL1 and the light sensitive resistor LR1 returns to its high resistance. This reduces the voltage in the output stage of the amplification system to a level again which will not permit amplification.

The remainder of the circuitry is a standard Class B amplification circuit.

*Modified form of receiver and detector*

Figure 6:
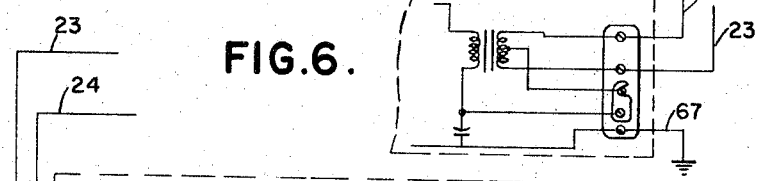
FIGURE 6, is a schematic electrical circuitry diagram of a modified pick up unit for use with the receiver unit illustrated in FIGURE 5.
Figure 5:
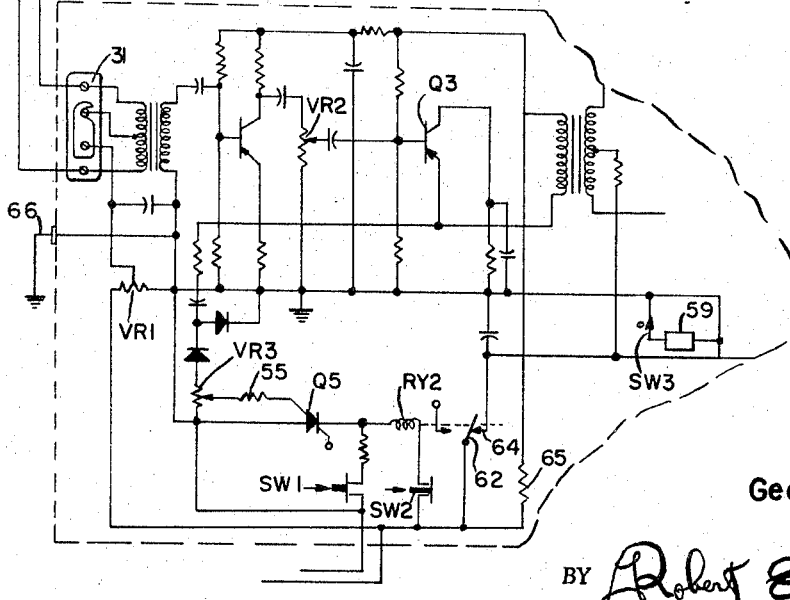
FIGURE 5 is a schematic electrical circuitry diagram of a modified form of receiver.
Figure 8:
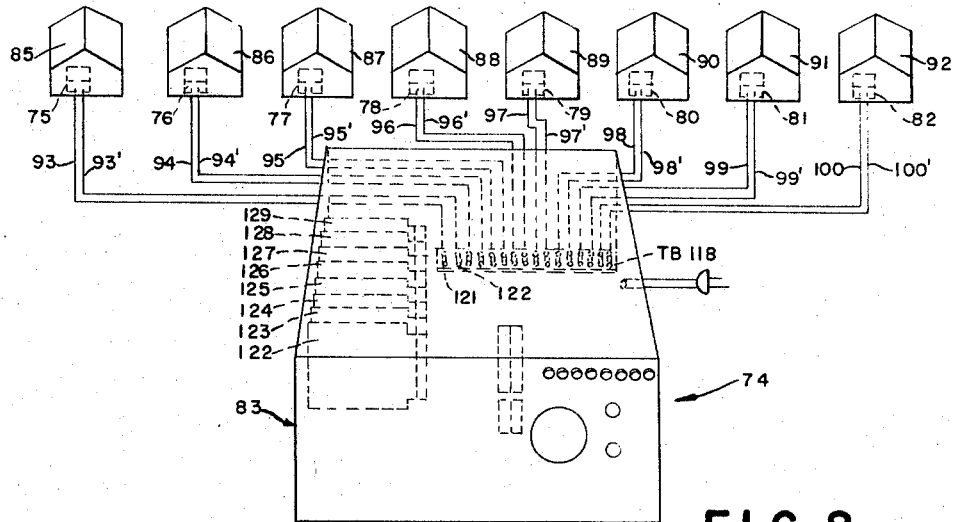
FIGURE 8 is a perspective view of the third modified form of receiver-detector alarm unit wherein one receiver unit serves light detector units.

In the modified form of detector and receiver unit illustrated in FIGURES 5 and 6, the detector and receiver unit electrical circuitry is the same as illustrated in FIGURES 2 and 3 except that when the signal or sound transmitted from the detector unit is stronger or at a high level than the sound level to which VR3 has been adjusted and Q5 becomes conductive and it will activate a relay RY2 which shifts switch 62 clockwise, when viewed from FIGURE 5, so as to contact terminal 64 and there by-pass resistor 65. This enables the amplification system to operate and the sounds picked up by the speaker of the detector unit will be amplified by the receiver unit and reproduced by the speaker.

Since Q5' will remain in a state of conduction once placed in a conductive state, the relay RY2 will remain activated or on and will allow the amplification system to remain activated, so that all sounds from the detector unit will be reproduced at the volume level set by VR2. Once the reset button SW2 is pushed, this deactivates the relay RY2 which switches contact 62 counterclockwise and the transistor Q5 returns to a state of non-conduction until a signal triggers it on again.

In the receiver and detector units illustrated in FIGURES 5 and 6, a balanced line operation is utilized and a water pipe or good earth ground is necessary. The ground 66 is provided for the receiver unit and the ground 67 is provided for the detector unit. In the receiver and detector unit illustrated in FIGURES 2 and 3, an unbalanced line operation is utilized and the grounding described is not necessary.

Figure 4:
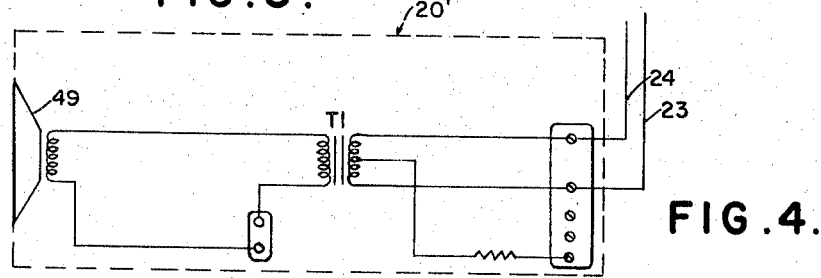
FIGURE 4 is a schematic electrical circuitry diagram of a modified form of pick up unit for use with the first form of receiver unit illustrated in FIGURE 2.
Figure 7:
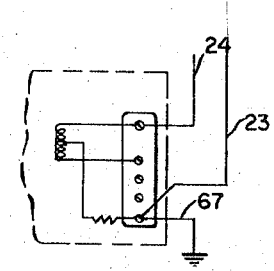
FIGURE 7 is a schematic electrical circuitry diagram of a second modified pick up unit for use with the receiver unit illustrated in FIGURE 5.

In FIGURE 7, the modified form of detector unit has the same electrical circuitry as the detector unit illustrated in FIGURE 4, except that the terminal connections are changed for a balanced line operation so that the receiver unit may be used with the detector unit.

In the balanced line operation of the receiver and detector unit illustrated in FIGURES 5 and 6, the power pack not shown is the same as illustrated in FIGURE 2, and the power from the power pack is fed through the receiver to the terminal post 46, along strap 31′ to terminal 45, along line 47 to the center tap of winding 35 of transformer T2, out opposite ends of the winding 35 along lines 23 and 24 to winding out through the center tap 48 to terminal 70 along line 71 to the speaker 49.

Terminal strips 72 and 73 are provided for the detector units to provide a connection for various devices such as an auxiliary switching device, photocell, switch motion detection devices and etc.

If the telephone lines 23 or 24 are cut, this would place a momentary short across terminals 29 and 30. When the short is removed, a voltage peak would be amplified. This would activate the pilot light PL1 and the relay RY1 and the line noise which is characteristic of an open telephone, would be amplified.

The detector unit 20 will normally be placed in a building which is to be protected against burglars and the receiver unit may be located in the home of the operator, for bedside operation. A private telephone line between the bulding to be protected and the operator's home will be installed and the detector unit attached to the one end of the telephone line and the receiver unit attached to the other end.

The operator will turn on the main switch and assuming that the variable resistor VR1 has been previously adjusted for the length of telephone line, the operator will turn the volume of VR2 up to its maximum value. The operator will also adjust the variable resistor VR3 to a level where Q5 will not trigger on the amplification system of the receiver unit when the detector or pick up unit is only picking up such faint sounds or signals or back ground noises, such as possibly a car going by outside the building where the detector unit is located. The operator may then press the test button SW1, which causes the pilot light PL1 to illuminate, thereby reducing the resistance in LR1 and causes the amplification system to operate and amplify and reproduce any sounds at the building where the detector unit is located, and the operator can listen to determine if the receiver and detector unit are operating. The operator may then release SW1, which extinguishes PL1, and the operator may then retire for the night.

With the receiver unit 25 located beside the bed of the operator, VR3 will be set to trigger on its amplification system if there are noises within the building 22, such as a person talking, the dropping of an instrument or shuffling of paper, hammering or breaking of glass, or jimmying of a door, by placing Q5 in a conductive state thereby illuminating the pilot which reduces the resistance of LR1 which in turn places the amplificaton system in operation causing the speaker 58 in the receiver unit 25 to reproduce only sounds in the building 22 at full volume. Also the buzzer 59 will energize.

The energized buzzer and the amplified sounds from the building 22 will be sufficient to awaken the normal sleeper. The operator, awakened by the buzzer and amplified sounds, may then open SW3, by turning it counterclockwise from its position shown in FIGURE 1 or 5, thereby turning off the buzzer.

The operator may also by turning VR2 to a lower value reduce the volume of amplification to a level for easy hearing of the sounds. If after an interval of time of listening to the sounds being reproduced, the operator is convinced the sounds or noises heard are harmless, he will then press the reset button SW2 which will deactivate Q5, the pilot light, and the amplification system and no sound will be amplified and reproduced until the sound level in building 22 again exceeds the level set by the variable resistor VR3.

Thus, it will be seen that a novel sound detection device has been provided which enables the operator to sleep undisturbed except by such noises of such magnitude as are normally associated with a person or persons trespassing within a building, and when such sounds do occur the device will amplify them so that the operator may actually hear the sounds emanating from the building where the detector unit of the device is located.

The pilot light PL2 on the power pack is activated by the main switch portion SW1B and indicates that the detector and receiver units are turned on.

The additional subject matter added by this continuation-in-part application is illustrated in FIGURES 8–12, inclusive, and is described as follows:

The third modified form of detector-receiver unit 74 comprises a plurality (8) detector units 75–82 and one receiver unit 83 which serves all light detector units 75–82. Each of the detector units 75–82 is placed in individual buildings 85–92 to protect each of these buildings 85–92. The detector units 75–82 are connected to the receiver unit 83 by telephone lines 93 and 93′, 94 and 94′, 95 and 95′, 96 and 96′, 97 and 97′, 98 and 98′, 99 and 99′, and 100 and 100′. The sounds picked up by any of the detector units will be transmitted over these telephone lines to the receiver unit 83.

*Detector units*

Figure 9:
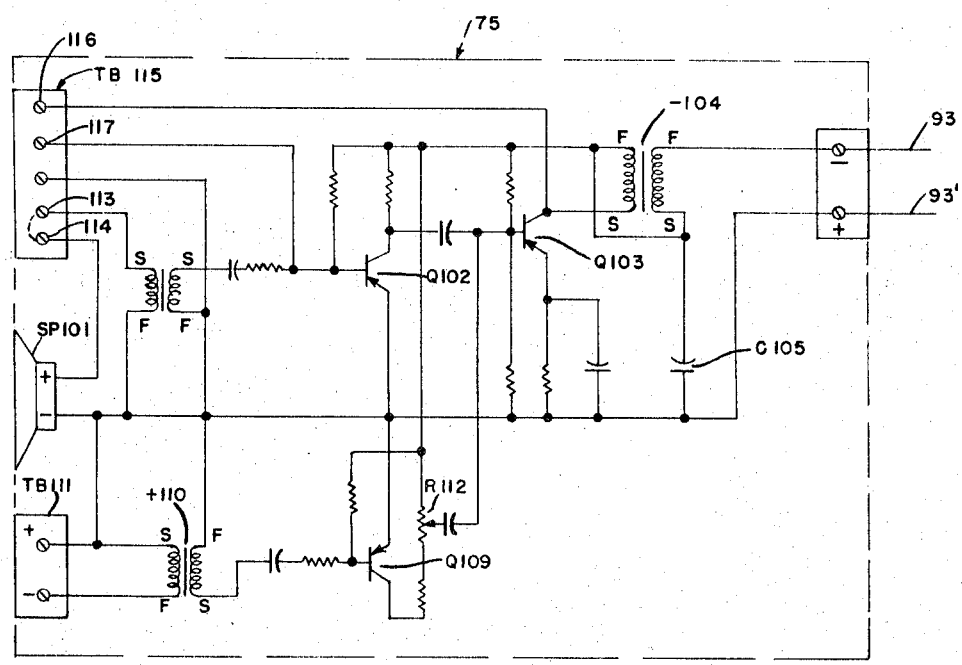
FIGURE 9 is a schematic circuitry diagram of the detector unit of the third modified form.

Since each of the eight detector units 75–82 is identical to one another, for purposes of illustration only the detector unit 75 is illustrated in the drawings in a schematic circuitry diagram illustrated in FIGURE 9.

Each of the detector units, such as detector unit 75, illustrated in FIGURE 9, has a speaker SP101 which picks up any sound in the area of its respective building, which in the case of detector 75 is building 85. The sound picked up by speaker microphone SP101 is amplified by the two stage amplifier Q102 and Q103, illustrated in FIGURE 9 and is fed onto line 93, through transformer T104. The D.C. operating current for operating this amplifier is also supplied over the telephone lines 93′ through the secondary of T104, so that the power for operating the detector is received over the telephone line. The capacitor C105 places one end of the transformer T104 secondary at audio ground potential, but allows D.C. to pass on to the D.C. operating bus of the amplifier.

Figure 9A:
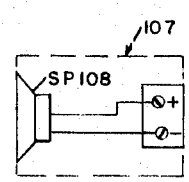
FIGURE 9A is a schematic diagram of a second speaker unit for said detector unit.

As a modification to the detector unit a second speaker unit 107, illustrated in FIGURE 9A, may also be used with speaker SP101. The second speaker unit 107 has a speaker SP108 and the speaker unit 107 is adapted to be connected to the terminals at TB111 of FIGURE 9. Q109 and its associated components are identical to those of Q102, except for the reverse phase connection of the primary of T110. Any signals amplified by Q109 channel will therefore be out of phase with those of Q102 channel and if the amplified levels are equal at the base terminals of Q103 they will cancel out and no signal will be amplified by Q103.

The purpose of this second speaker modification is to locate the detector unit 75, with microphone speaker SP101, inside the building 85; while the second speaker unit 107, with speaker SP108 is to be located outside building 85 and connected with SP101 at terminal post TB111. If a noise occurs outside the building of sufficient amplitude to penetrate into the interior of the building, it will be detected by both SP101 and SP108, the noise reaching SP101, however, will have been attenuated to a lesser level due to the absorption or reflection during the process of penetrating the walls of the building. The amplified signal through Q109 will therefore be of greater amplitude than the same signal amplified by Q102 channel at the base terminal of Q103. The resistor R112 in the Q109 channel permits the Q109 signal to be exactly balanced in level with the Q101 signal and therefore effect a cancellation.

While this same setting is in effect for R112, a much lower noise level may occur inside the building 85 and be detected by SP101. This will produce a signal at the base of Q103 that may be amplified and passed on as an alarm signal. Very little or none of this inside noise will reach the outside speaker SP108 and therefore would produce little or no cancellation signal at the base of Q103, allowing the Q102 signal to pass on to Q103 and be amplified. The purpose of this additional speaker structure is to eliminate the detection of outside "nuisance" noises as occur in certain areas, such as by a train going by, and therefore eliminate false intrusion alarms. This second speaker unit may be preferably mounted outside on the roof of the building being protected.

Various conventional circuit opening and closing devices may be connected to terminals 113 and 114 of terminal board TB115 for the purpose of making SP101 inoperative to sound pick up. Also any device which will produce a momentary contact such as a thermostat, electric eye, or the like, for example, will, when connected TB115 terminals 116 and 117, produce a tone which will be transmitted over the line to the receiver and produce an alarm signal.

Receiver unit

The audio signal, pick up by SP101 and amplified, and having been transmitted over the telephone lines 93 and 93' in the case of detector 75, on the other telephone lines in the case of the other detectors will enter the receiver unit 83 through terminal board TB118 of the alarm receiver module 119. In the case of detector unit 75, it will enter through terminals 120 and 121 of TB118, and like successive terminals as to the other telephone lines. Lines 93 and 93' correspond to lines 24 and 23 previously described.

The receiver unit 83 has eight printed cards 122-129, for the respective detector units 75-82. However, only the one card 122 for detection unit 75 is illustrated and a fragment of the card 123 for detector unit 76 is illustrated in FIGURES 10, 10A and B to describe the operation since the cards 122-129 are identical to one another.

The signal received through the terminals 120 and 121, for detector unit 75 and similarly for the other detector units and their corresponding cards, will be amplified through the first transistor stage Q124 of the printed card 122. At the collector of Q124, the signal takes two paths. Path No. 1 is through transformer T125 and out the card through terminal plugs P2 and P3 of terminals P1–P7, of card 122. The second path is through C133 to Q124' where it is further amplified and fed into potentiometer R134. R134 serves as a noise threshold or sensitivity control.

The selected amount of signal voltage is fed to the turn on gate of silicon controlled amplifier Q135 through the contacts of relay Ry136. When an amplified signal produces a voltage at the turn on gate of Q135 of sufficient level, Q135 is triggered into conduction and energizes the coil of Ry136. This operates the relay Ry136 and removes any further signal from the gate of Q135.

Q135 is a silicon controlled rectifier switch or other solid state device of the latching type.

Relay 136' is a sensitive relay with its coil in series with the 24 D.C. supply that is fed through rheostat R137 and the primary of transformer T138 and onto the telephone line. R137 regulates the amount of voltage fed onto the line to compensate for the resistance of various lengths of telephone lines that might be used between this receiver unit and the remote detector unit. If one or more of the wires of the telephone line cable pair are broken, cut, or otherwise interrupted, the current through the coil of Ry136' ceases. The contacts of relay Ry136' then produce a by-pass or short circuit around Q3 and energize the coil of relay Ry136. If the telephone line is shorted at any point either momentarily a loud click is produced and produces the alarm action described above. The coil circuit of Ry136 is transferred through the terminal P4 of the printed card, through terminal S4 of the socket SO140 of the rack, through rack wiring and socket SO148' further through plug PL149' and through silicone rectifier SR151 to relay Ry150.

Ry150 then is energized simultaneously with Ry136 in the alarm receiver module. Any one of the eight alarm receiver modules may energize Ry150 through its respective silicone rectifier (SR151–158).

At the same time Ry150 is energized a pilot light in the knob of the corresponding push button switch SW159 of switches SW159–166 is illuminated. When this lighted button switch is depressed, the 12 v. D.C. monitor amplifier (transistor) 168 is energized along with its pilot light 169.

At the same time, sections A and B of SW159, in being pressed, connects the signal input of the monitor amplifier 168 to the corresponding signal lines P2, S2 and P3, S3 of the corresponding alarm receiver module (printed card) 122 and amplifies any sound coming into the module from its corresponding telephone line and remote sound detector 75.

Likewise, sections A and B of any one of the other switches 160–167, in being pressed connects the signal input of the monitor amplifier to the corresponding signal line of the corresponding alarm receiver module and amplifies any sound coming into the module from its corresponding telephone line and remote detector.

Section C of the switch 159, in being pressed, places a short circuit around Q135 in the alarm receiver module. This action retains Ry136 and Ry150 in their energized position but removes the holding potential from Q135, allowing it to return to a non-conductive state so that when the depressed button 159 is unlatched (after the operator no longer wished to monitor) the relay 135 returns to its "no alarm" position. Ry150 also returns to its "no alarm" position, unless it is being held in the alarm position by another alarm receiver module (card) having been activated.

If another alarm receiver module (printed card) has been activated while the previous monitoring was in progress, the line from terminal P4 on that module will have established a second circuit through the corresponding SR in the monitor control module and still hold Ry150 in the alarm position and energize the corresponding push button light.

When all alarms have been monitored and all push buttons released, there will be no circuits to Ry150 through any of the rectifiers (SR) and Ry150 will also return to the "no alarm" position.

If it is desired to hold one alarm circuit in the alarm position while monitoring another circuit, one of the hold buttons (HB168–HB175) corresponding to the monitored circuit, and beside its corresponding lighted push button, may be pressed. When the operator wishes to return to the first original circuit, the light for that circuit having been held on may be readily identified, as the previous circuit being monitored.

Another push on this hold button will release this first circuit if the corresponding lighted switch is also unlatched.

A ninth button may be provided as a release button for the eight lighted buttons.

The capacitor C143 is of sufficient capacity to place the junction of R137 and the low end of T138 at ground potential at audio frequencies.

On initial installation would be one section which consists of one alarm receiver module rack 119, with as many, up to eight, alarm receiver modules (122-129), as needed, one for each location to be protected. One monitor control module 177, one buzzer or alarm tone module 178, one conventional power supply (not shown) and a cabinet to house the same, or other groups of module sections. When the number of remote locations exceeds eight, another section will be added to the cabinet if an oversized cabinet is used, less the alarm tone module.

One alarm tone module can serve up to eight sections of eight module sections each of 64 remote protected locations. The alarm tone module 178 connects to the TB179 of the first monitor control module 177 installed in a cabinet. Seven additional 8 module groups or sections may be installed in the console having an oversized cabinet, one or more at a time. If the TB180 of the original monitor control module 177 is properly connected to the other TB181 terminals, all of the module groups will operate the one alarm tone module 178 if an alarm signal is received.

When the operator desires to monitor an alarm signal he may operate SW183 and stop the alarm tone 184. The alarm tone 184 is a 12 v. D.C. alarm tone device, electro-mechanical or solid state. A pilot light 185 shows the operator when the alarm tone is off or on.

Relay Ry150 performs three functions (1) energizes the 12 v. D.C. tone generating device 178 when connected to TB179; (2) performs switching of the TB181 terminals for any purpose desired (tape machine, auxiliary lights, bells, etc.); and (3) ground the terminals of TB182.

The connections of sockets SO148 and PL149 mate with each other and the connections of socket SO148' and PL149' mate with each other, and of course plugs P1-P8 of each card mates with sockets S1-S8 of the respective sockets SO140-SO147, to provide electrical connections.

All incoming telephone lines 93-93'—100-100' connect to TB118 on the alarm receiver module rack 119. The rack contains 8 sockets SO140-SO147 for the eight alarm receiver module plug in cards 122-129. Connections to the powder supply are also made to this rack through cord 186 and plug 187.

The additional matter added to the earlier application by this continuation-in-part includes several minor informal corrections to the drawings of the original application.

It will be obvious that various changes and departures may be made in the invention without departing from the spirit and scope thereof and accordingly it is not intended that the invention be limited to that specifically described in the specification or disclosed in the drawings but only as set forth in the appended claims wherein—

What is claimed is:

1. A device comprising a receiver and pick up unit, telephone lines connecting said receiver unit to said pick up unit, said pick up unit being powered by said recever unit, said pick up unit being adapted to pick up sounds within its range and transmit them to the receiver unit, said receiver unit comrising an amplification system, and reproducing system, and a triggering unit, said triggering unit including adjustable means preventing amplification and reproduction of said sounds until said sounds have reached the level set by said adjustable means, said receiver also including a second adjustable means to compensate for different lengths of telephone lines, said pick up unit being positioned in an area being protected such as a building, said pick up unit including a first microphone speaker in the building, and a second microphone speaker outside of the building, said microphone speakers being connected in opposite phase, means to electrically adjust for the intensity of outside sounds reaching both microphone speakers so that the electronic signal of such outside sounds will be cancelled and no signal will emanate through the telephone lines to the receiver, said inside microphone speaker being actuated by sounds within the building and effectively carrying the signal to the receiver, and means on the receiver for producing a signal showing that an unusual sound has been produced within the building and a reproduction of such sound will be received at said speaker in said receiver.

2. A device comprising a receivcer and pick up unit, lines connecting said receiver unit to said pick up unit, said pickup unit being adapted to pick up sounds within its range and transmit them to the receiver unit, said receiver unit including an amplification and reproducing system and a triggering unit, said triggering unit including adjustable means preventing reproduction of said sounds until said sounds have reached a level set by said adjustable means, said pick up unit being positioned in an area being protected such as a building, said pick up unit including a first microphone speaker in the building, and a second microphone speaker outside of the building, said microphone speakers being connected in opposite phase, means to electrically adjust for the intensity of outside sounds reaching both microphone speakers so that the electronic signal of such outside sounds will be cancelled and no signal will emanate through the lines to the reeciver, said inside microphone speaker being actuated by sounds within the building and effectively carrying the signal to the receiver, and means on the receiver for producing a signal showing that an unusual sound has been produced within the building and a reproduction of such sound will be received at said speaker in said receiver.

References Cited

UNITED STATES PATENTS

| 2,696,524 | 12/1954 | Huntington et al. | 179—5 |
| 2,709,251 | 5/1955 | Schmidt | 340—261 |
| 3,134,970 | 5/1964 | Kelly et al. | 340—261 |
| 3,304,547 | 2/1967 | Bristol | 340—261 |
| 3,340,521 | 9/1967 | Patterson et al. | 340—261 X |

ROBERT L. GRIFFIN, *Primary Examiner.*

WILLIAM S. FROMMER, *Assistant Examiner.*

U.S. Cl. X.R.

340—261